(12) United States Patent
Millner

(10) Patent No.: US 10,277,472 B2
(45) Date of Patent: Apr. 30, 2019

(54) SYSTEM AND METHOD FOR IMPROVED ADVERTISEMENT OF DYNAMIC STORAGE ENDPOINTS AND STORAGE CONTROL ENDPOINTS

(71) Applicant: DATERA, INC., Sunnyvale, CA (US)

(72) Inventor: Robert Louis Millner, San Jose, CA (US)

(*) Notice: Subject to any disclaimer, the term of this patent is extended or adjusted under 35 U.S.C. 154(b) by 0 days.

(21) Appl. No.: 15/619,341

(22) Filed: Jun. 9, 2017

(65) Prior Publication Data

US 2018/0359154 A1 Dec. 13, 2018

(51) Int. Cl.
*H04L 5/14* (2006.01)
*H04L 12/24* (2006.01)
*H04L 12/751* (2013.01)
*H04L 29/08* (2006.01)

(52) U.S. Cl.
CPC .............. *H04L 41/12* (2013.01); *H04L 45/02* (2013.01); *H04L 69/325* (2013.01)

(58) Field of Classification Search
CPC ........... H04L 12/5601; H04L 29/06163; H04L 41/04; H04L 41/12; H04L 45/02; H04L 45/04; H04L 45/50; H04L 49/606; H04L 2012/5665; H04L 2012/5667
See application file for complete search history.

(56) References Cited

U.S. PATENT DOCUMENTS

| | | | | |
|---|---|---|---|---|
| 8,301,739 B1* | 10/2012 | Krishnan | ............ | H04L 67/1097 709/217 |
| 8,959,185 B2* | 2/2015 | Nakil | .................. | H04L 41/0668 370/351 |
| 2014/0250322 A1* | 9/2014 | Fleischmann | ....... | G06F 12/0246 714/6.22 |

* cited by examiner

*Primary Examiner* — Frank Duong
(74) *Attorney, Agent, or Firm* — Barry Choobin; Patent 360

(57) ABSTRACT

The present invention provides a system and method that improves efficiency and resilience of the communications between clients and nodes, and between the nodes of a distributed, scale-out storage system by participating in the topology of an L3 network. The present disclosure relates to a device in a network. The receiving module is configured to receive information associated with the storage endpoints advertised by nodes of the network, wherein the information is an IP address associated with the storage endpoints or removal and/or updation of the IP address of the storage endpoints. The update module is configured to summarize or re-advertise the information received from the one or more nodes, and advertise the summarized or re-advertised information to all nodes of the network to be utilized by the one or more nodes to achieve communication between the node and the storage endpoint based on the summarized or re-advertised information.

10 Claims, 2 Drawing Sheets

SYSTEM AND METHOD FOR IMPROVED ADVERTISEMENT OF DYNAMIC STORAGE ENDPOINTS AND STORAGE CONTROL ENDPOINTS

TECHNICAL FIELD

The present invention relates to modifying a network topology, in particular to an advertisement of dynamic storage endpoints and storage control endpoints to a network.

BACKGROUND

Background description includes information that may be useful in understanding the present invention. It is not an admission that any of the information provided herein is prior art or relevant to the presently claimed invention, or that any publication specifically or implicitly referenced is prior art.

Conventionally known, a network topology is the arrangement of a network, including its nodes and connecting lines. There are two ways of defining network geometry: the physical topology and the logical (or signal) topology. The physical topology of a network is the actual geometric layout of workstations. Nodes can be placed at various locations in a structure to distribute data and/or collect data. For example, a node can include a sensor, a wireless router, and/or a camera. During installation of nodes, a site survey team can design a network topology for the placement of the nodes. The design can be provided to a contractor, who can install the nodes according to the design. However, mistakes can be made by the contractor, resulting in an incorrect placement of one or more of the nodes.

As such, incorrect placement of a node can affect distribution and/or collection of data. For instance, an incorrectly placed wireless router can result in an area not receiving a wireless signal and/or an area receiving a degraded wireless signal. Alternatively, and/or in addition, data and/or images may not be collected from an area if a sensor and/or camera is placed in an incorrect area.

Conventionally, the endpoint IP addresses of a distributed, scale-out storage system were subject to one or more following constraints when operating on networks, such as over a data center network, specifically an Layer 3 (L3) Data Center network:
  i. The endpoint IP addresses could only be statically defined and could not move; for example due to a failure condition or to maximize efficiency of communication with a client.
  ii. The endpoint IP addresses could be dynamic, but could only be presented in a statically defined region of the distributed L3 network topology (ex: a single rack), were subject to common failure modes, and could not be located to maximize efficiency of communication with a client.
  iii. The endpoint IP addresses could be dynamic, and located to avoid common failure modes; however, doing so requires an L2 overlay (ex: VXLAN) on a distributed L3 network which adds cost and complexity and does not maximize the efficiency of communication with a client.

Thus, there is a dire need to provide a system and method that improve efficiency and resilience of the communications between clients and nodes, and between the nodes of a distributed, scale-out storage system by participating in the topology of an L3 network.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities or dimensions of items, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context.

The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability.

SUMMARY

The present invention is mainly solves the technical problems of the prior art existed. In response to these problems, the present invention provides a system and method that improves efficiency and resilience of the communications between clients and nodes, and between the nodes of a distributed, scale-out storage system by participating in the topology of an L3 network. The present invention enables to advertise dynamic storage endpoints and storage control endpoints to an L3 network.

An aspect of the present disclosure relates to a device in a network. The device includes a non-transitory storage device having embodied therein one or more routines operable to summarize or re-advertise information associated with storage endpoints of the network, and one or more processors coupled to the non-transitory storage device and operable to execute the one or more routines.

The one or more routines include a receiving module and an update module. The receiving module is configured to receive at least information associated with the storage endpoints advertised by one or more nodes of the network, wherein the information is an IP address associated with the storage endpoints or removal and/or updation of the IP address of the storage endpoints. The update module is configured to summarize or re-advertise the information received from the one or more nodes, and advertise the summarized or re-advertised information to all nodes of the network to be utilized by the one or more nodes to achieve communication between the node and the storage endpoint based on the summarized or re-advertised information.

In an aspect, the storage endpoints are presented on a distributed, scale-out storage system comprised of storage nodes and are managed as a collective by a distributed control system and preferably configured to distribute storage requests among storage nodes.

In an aspect, the information associated with the storage endpoints are advertised to the device by utilizing a dynamic routing protocol.

In an aspect, the network is an L3 data-center network or an L3 network adapted to span data centers.

In an aspect, the summarized or re-advertised information is adapted to cause route tables on all the nodes and/or networking equipments to change or update or reflect a new or altered path to the storage endpoints based on the information.

An aspect of the present disclosure relates to a system having one or more nodes and one or more storage endpoints having respective IP addresses forming a network, and at least one device selected form the one or more nodes. The device includes a receiving module configured to receive at least information associated with the storage endpoints advertised by the one or more nodes of the network, wherein the information is IP addresses associated with the storage endpoints or removal and/or updation of the IP address of the storage endpoints. The device also includes a an update module configured to summarize or re-advertise the information received from the one or more nodes, and advertise the summarized or re-advertised information to all nodes of the network to be utilized by the one or more nodes to achieve communication between the node and the storage endpoint based on the summarized or re-advertised information.

An aspect of the present disclosure relates to a method comprising the steps of advertising, by one or more nodes of an network, an information associated with at storage endpoints available on the network, wherein the information is an IP address associated with the storage endpoint or removal and/or updation of the IP address of the storage endpoint; receiving, by a device selected from the one or more nodes of the network, the information associated with the storage endpoints advertised by one or more nodes; summarizing, by the device, the information received from the one or more nodes based on the information received; advertising, by the device, the summarized information to nodes of the network; and utilizing, by nodes of the network, the summarized information to achieve communication between the node and the storage endpoint.

In an aspect, the method further includes the steps of utilizing a dynamic routing protocol to advertise the information associated with the storage endpoints to the device.

In an aspect, the network is an L3 data-center network or an L3 network adapted to span data centers.

Other features of embodiments of the present disclosure will be apparent from accompanying drawings and from detailed description that follows.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
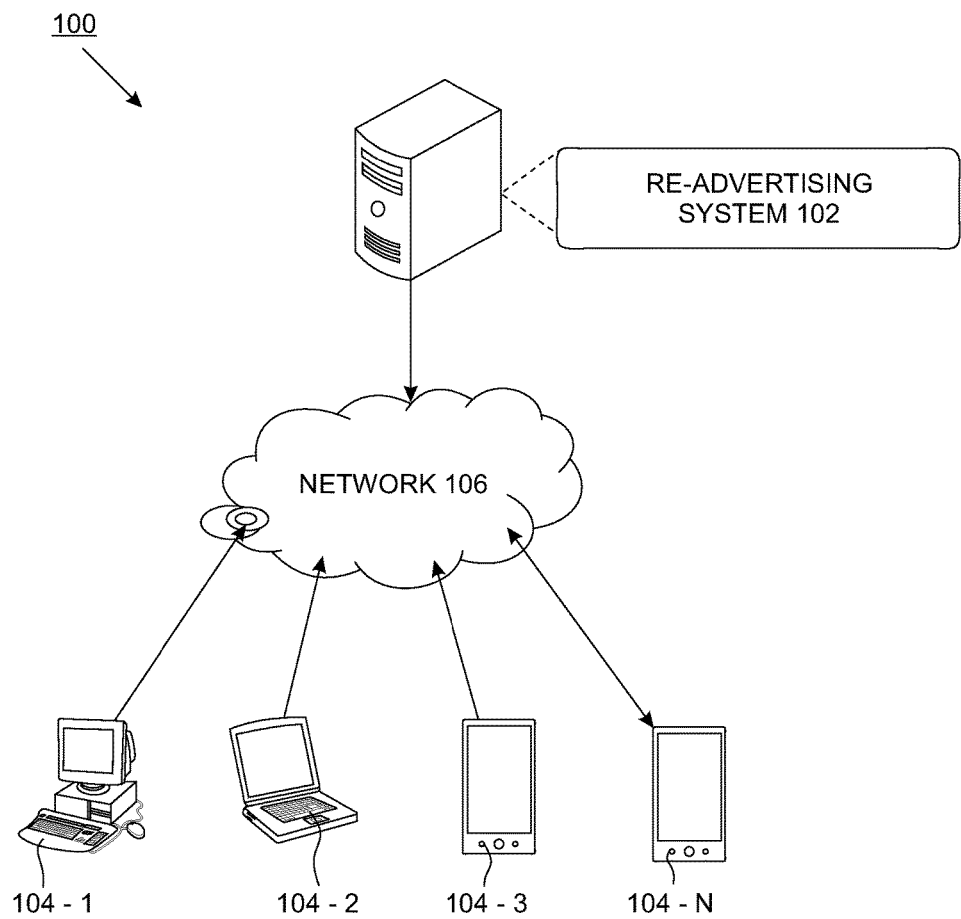
FIG. 1 illustrates a network implementation of a re-advertising system to re-advertise information associated with storage endpoints of the network, in accordance with an embodiment of the present subject matter.

Systems and methods are disclosed for improve efficiency and resilience of the communications between clients and nodes, and between the nodes of a distributed, scale-out storage system by participating in the topology of an L3 network. Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware, and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

If the specification states a component or feature "may", "can", "could", or "might" be included or have a characteristic, that particular component or feature is not required to be included or have the characteristic.

Although the present disclosure has been described with the purpose of data placement on a storage cluster, it should be appreciated that the same has been done merely to illustrate the invention in an exemplary manner and any other purpose or function for which explained structures or configurations can be used, is covered within the scope of the present disclosure.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

The endpoint IP addresses of a distributed, scale-out storage system were subject to one or more following constraints when operating on either an L3 data-center network (ex: CLOS, Leaf-Spine) or an L3 data-center to data-center network:

i. The endpoint IP addresses could only be statically defined and could not move; for example due to a failure condition or to maximize efficiency of communication with a client.

ii. The endpoint IP addresses could be dynamic, but could only be presented in a statically defined region of the distributed L3 network topology (ex: a single rack), were subject to common failure modes, and could not be located to maximize efficiency of communication with a client.

iii. The endpoint IP addresses could be dynamic, and located to avoid common failure modes; however, doing so requires an L2 overlay (ex: VXLAN) on a distributed L3 network which adds cost and complexity and does not maximize the efficiency of communication with a client.

Thus, there is a dire need to provide a system and method that improve efficiency and resilience of the communications between clients and nodes, and between the nodes of a distributed, scale-out storage system by participating in the topology of an L3 network.

The present invention is mainly solves the technical problems of the prior art existed. In response to these problems, the present invention provides a system and method that improves efficiency and resilience of the communications between clients and nodes, and between the nodes of a distributed, scale-out storage system by participating in the topology of an L3 network. The present invention enables to advertise dynamic storage endpoints and storage control endpoints to an L3 network.

An aspect of the present disclosure relates to a device in a network. The device includes a non-transitory storage device having embodied therein one or more routines operable to summarize or re-advertise information associated with storage endpoints of the network, and one or more processors coupled to the non-transitory storage device and operable to execute the one or more routines.

The one or more routines include a receiving module and an update module. The receiving module is configured to receive at least information associated with the storage endpoints advertised by one or more nodes of the network, wherein the information is an IP address associated with the storage endpoints or removal and/or updation of the IP address of the storage endpoints. The update module is configured to summarize or re-advertise the information received from the one or more nodes, and advertise the summarized or re-advertised information to all nodes of the network to be utilized by the one or more nodes to achieve communication between the node and the storage endpoint based on the summarized or re-advertised information.

In an aspect, the storage endpoints are presented on a distributed, scale-out storage system comprised of storage nodes and are managed as a collective by a distributed control system and preferably configured to distribute storage requests among storage nodes.

In an aspect, the information associated with the storage endpoints are advertised to the device by utilizing a dynamic routing protocol.

In an aspect, the network is an L3 data-center network or an L3 network adapted to span data centers.

In an aspect, the summarized or re-advertised information is adapted to cause route tables on all the nodes and/or networking equipments to change or update or reflect a new or altered path to the storage endpoints based on the information.

An aspect of the present disclosure relates to a system having one or more nodes and one or more storage endpoints having respective IP addresses forming a network, and at least one device selected form the one or more nodes. The device includes a receiving module configured to receive at least information associated with the storage endpoints advertised by the one or more nodes of the network, wherein the information is IP addresses associated with the storage endpoints or removal and/or updation of the IP address of the storage endpoints. The device also includes a an update module configured to summarize or re-advertise the information received from the one or more nodes, and advertise the summarized or re-advertised information to all nodes of the network to be utilized by the one or more nodes to achieve communication between the node and the storage endpoint based on the summarized or re-advertised information.

An aspect of the present disclosure relates to a method comprising the steps of advertising, by one or more nodes of an network, an information associated with at storage endpoints available on the network, wherein the information is an IP address associated with the storage endpoint or removal and/or updation of the IP address of the storage endpoint; receiving, by a device selected from the one or more nodes of the network, the information associated with the storage endpoints advertised by one or more nodes; summarizing, by the device, the information received from the one or more nodes based on the information received; advertising, by the device, the summarized information to nodes of the network; and utilizing, by nodes of the network, the summarized information to achieve communication between the node and the storage endpoint.

In an aspect, the method further includes the steps of utilizing a dynamic routing protocol to advertise the information associated with the storage endpoints to the device.

In an aspect, the network is an L3 data-center network or an L3 network adapted to span data centers.

FIG. 1 illustrates a network implementation of a re-advertising system to re-advertise information associated with storage endpoints of the network, in accordance with an embodiment of the present subject matter.

Referring now to FIG. 1, a network implementation 100 of a re-advertising system to re-advertise information associated with storage endpoints of the network is illustrated, in accordance with an embodiment of the present subject matter. In one embodiment, the storage resource placement decision system 102 provides resource placement decision among one or more nodes of the network based on network topology information.

Although the present subject matter is explained considering that the re-advertising system 102 is implemented on a server, it may be understood that the re-advertising system 102 may also be implemented in a variety of computing systems, such as a laptop computer, a desktop computer, a notebook, a workstation, a mainframe computer, a server, a network server, and the like. It will be understood that the re-advertising system 102 may be accessed by multiple users through one or more user devices 104-1, 104-2 . . . 104-N, collectively referred to as user 104 hereinafter, or applications residing on the user devices 104. Examples of the user devices 104 may include, but are not limited to, a portable computer, a personal digital assistant, a handheld device, and a workstation. The user devices 104 are communicatively coupled to the re-advertising system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
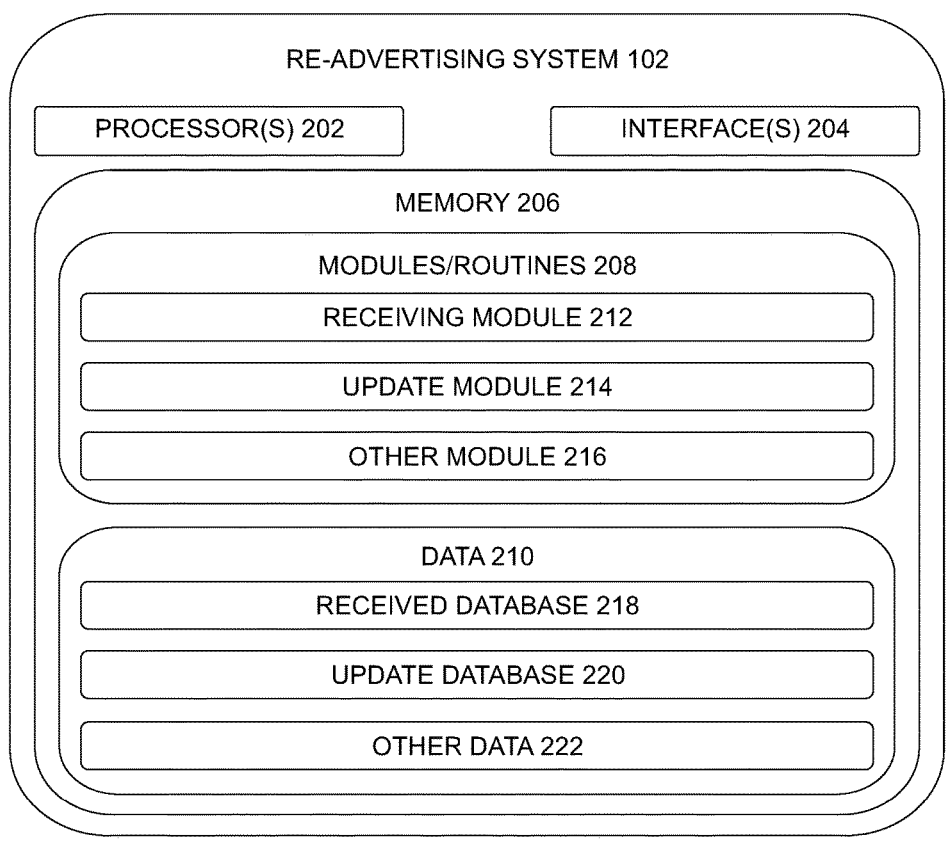
FIG. 2 illustrates the proposed system, in accordance with an embodiment of the present subject matter.

FIG. 2 illustrates the proposed system, in accordance with an embodiment of the present subject matter. Referring now to FIG. 2, the re-advertising system 102 is illustrated in accordance with an embodiment of the present subject matter. In one embodiment, the re-advertising system 102 may include at least one processor 202, an input/output (I/O) interface 204, and a memory 206. The processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the re-advertising system 102 to interact with a user directly or through the client devices 104. Further, the I/O interface 204 may enable the re-advertising system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks or implement particular abstract data types. In one implementation, the modules 208 may include a receiving module 212, an update module 214, and other modules 216. The other modules 216 may include programs or coded instructions that supplement applications and functions of the re-advertising system 102.

The data 210, amongst other things, serves as a repository for storing data processed, received, and generated by one or more of the modules 208. The data 210 may also include received database 218, update database 220, and other data 222. The other data 222 may include data generated as a result of the execution of one or more modules in the other module 216.

In one implementation, the receiving module 212 is configured to receive at least information associated with the storage endpoints advertised by one or more nodes of the network, wherein the information is an IP address associated with the storage endpoints or removal and/or updation of the IP address of the storage endpoints. The update module 214 is configured to summarize or re-advertise the information received from the one or more nodes, and advertise the summarized or re-advertised information to all nodes of the network to be utilized by the one or more nodes to achieve communication between the node and the storage endpoint based on the summarized or re-advertised information.

In an exemplary implementation, a dynamic storage endpoint IP address (IPv4, IPv6, etc. . . . ) which may be allocated, de-allocated or moved and pertains to, but is not limited to, one or more of the following:
  i. An iSCSI resource.
  ii. An API based storage resource.
  iii. The storage of a data analytics resource.
  iv. A management interface or API of the control system ("Control Plane") of a distributed, scale-out storage system.
  v. The internal control communications of a distributed, scale-out storage system.
  vi. The internal storage communications of a distributed, scale-out storage system.

In an exemplary implementation, the storage endpoints are presented on a distributed, scale-out storage system comprised of storage nodes and is managed as a collective by a distributed control system ("Control Plane") and may distribute storage requests among nodes.

In an exemplary implementation, the present invention advertises dynamic storage endpoint IP addresses via a dynamic routing protocol (ex: BGP, OSPF) to an L3 data-centre network (ex: CLOS, Leaf-Spine) or an L3 network which spans data centres.

In an exemplary implementation, the present invention by advertising dynamic storage endpoint IP addresses enables the dynamic storage endpoint IP addresses may dynamically emerge anywhere in the topology of an L3 network and can change locations within said network in order to be located to avoid common failure modes in region of the network topology (ex: a single rack in the data center), and be located to provide efficient paths from clients to storage resources.

In another exemplary implementation, the present invention by advertising dynamic storage endpoint IP addresses do not require complicated, expensive L2 overlay networks (ex: VXLAN) in an L3 network in order to achieve efficiency or fault tolerance goals.

In another exemplary implementation, the present invention by advertising dynamic storage endpoint IP addresses participate in the redundancy configuration of an L3 network and be relocated to mitigate failure conditions or improve efficiency.

In an implementation, the present invention, dynamic routing software on the node is informed of the IP addresses of the storage endpoints, or of the removal of the IP address from the storage endpoint. The dynamic routing software on the node advertises the IP addresses of the storage endpoints (or lack thereof) to network equipment which may summarize or re-advertise that information. The dynamic routing software may cause route tables on clients, nodes or networking equipment to change to reflect a new or altered path to a storage endpoint IP address or the lack thereof.

In an implementation, the present invention when implemented as the control system of a distributed, scale-out storage system causes a storage resource or storage control resource to be allocated, moved or deleted.

In an embodiment, the endpoint can be allocated, moved or deleted. In another embodiment, an IP address for the endpoint is allocated, moved or deleted.

In an embodiment, the dynamic routing software, upon being informed of the IP addresses of the storage endpoints, or of the removal of the IP address from the storage endpoint, may cause route tables on clients, nodes or networking equipment to change to reflect a new or altered path to a storage endpoint IP address or the lack thereof.

In an implementation, a client or node causes packets to be sent to the endpoint IP address. The next hop of the path to the endpoint IP address is either programmed statically or by a dynamic routing protocol on the client or node. At least one of members of the intervening network equipment has its route table affected by the advertisement of the endpoint IP address, upon being informed of the IP addresses of the storage endpoints, or of the removal of the IP address from the storage endpoint, may cause route tables on clients, nodes or networking equipment to change to reflect a new or altered path to a storage endpoint IP address or the lack thereof, and makes a decision about where to send the packet next based on that information. The reply from the node to the client or node can follow the same procedure.

In an implementation, a client or node performs request through a storage endpoint. The request can be selected from, but is not limited to, read stored data or metadata about stored data, modify stored data or metadata about stored data, obtain information about the storage system, including endpoints, cause a storage resource to be allocated or deleted, and cause a change in the control software of a distributed, scale-out storage system. Accordingly, the client or node causes packets to be sent to the endpoint IP address as discussed above. The next hop of the path to the endpoint IP address is either programmed statically or by a dynamic routing protocol on the client or node. At least one of members of the intervening network equipment has its route table affected by the advertisement of the endpoint IP address, upon being informed of the IP addresses of the storage endpoints, or of the removal of the IP address from the storage endpoint, may cause route tables on clients, nodes or networking equipment to change to reflect a new or altered path to a storage endpoint IP address or the lack thereof, and makes a decision about where to send the packet next based on that information. The reply from the node to the client or node can follow the same procedure.

Further, a new storage endpoint may be emerged by the dynamic routing software, upon being informed of the IP addresses of the storage endpoints, or of the removal of the IP address from the storage endpoint, may cause route tables on clients, nodes or networking equipment to change to reflect a new or altered path to a storage endpoint IP address or the lack thereof.

In an embodiment, a distributed, scale-out storage system that can include one or more nodes with storage (ex: disks, flash) and network connections, a Distributed control software ("Control Plane"), distributed storage software ("Data Plane") that distributes storage requests among nodes communicating through endpoint IP addresses, client accessible storage resources presented on endpoint IP addresses, dynamic routing software which advertises endpoint IP addresses on one or more network connections.

In an exemplary embodiment, the distributed control software can run on one or more nodes, manages the hardware and software components of the nodes, and makes storage placement decisions, communicates those decisions between nodes and provides control interfaces and APIs on endpoint IP addresses.

In an exemplary embodiment, storage client(s) which access control API and storage resources can be one or more network connections, and may or may not contain similar components of the distributed, scale-out storage system.

In an exemplary embodiment, the dynamic routing software advertises paths to IP addresses.

In an embodiment, the present disclosure enables advertisement of dynamic storage endpoints and storage control endpoints to an L3 network via a dynamic routing protocol.

In an embodiment, the present disclosure improve efficiency and resilience of the communications between clients and nodes, and between the nodes of a distributed, scale-out storage system by participating in the topology of an L3 network.

In an embodiment, the present disclosure reduces both storage and networking costs while allowing for larger scale deployments by improving the efficiency and resilience.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments can include A, B, and C. The term "and/or" is used to avoid unnecessary redundancy.

Where the specification claims refers to at least one of something selected from the group consisting of A, B, C . . . and N, the text should be interpreted as requiring only one element from the group, not A plus N, or B plus N, etc. The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

While embodiments of the present disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

The invention claimed is:

1. A device in a network, comprising:
a non-transitory storage device having embodied therein one or more routines operable to summarize or re-advertise information associated with storage endpoints of the network; and
one or more processors coupled to the non-transitory storage device and operable to execute the one or more routines, wherein the one or more routines include:
a receiving module configured to receive at least an information associated with the storage endpoints advertised by one or more nodes of the network, wherein the information is an IP address associated with the storage endpoints or removal and/or updation of the IP address of the storage endpoints, wherein the IP address associated with the storage endpoints is advertised via a dynamic routing protocol to the network; and an update module configured to summarize or re-advertise the information received from the one or more nodes, and advertise the summarized or re-advertised information to all nodes of the network to be utilized by the one or more nodes to achieve communication between the node and the storage endpoint based on the summarized or re-advertised information, wherein the one or more nodes initiates a request through the storage endpoints, wherein the request is selected from at least one of: read stored data, modify stored data, and obtain information about a distributed scale-out storage system.

2. The device as claimed in claim 1, wherein the storage endpoints are presented on a distributed, scale-out storage system comprised of storage nodes the distributed scale-out storage system comprises one or more storage nodes; one or more network connections; a Distributed control software ("Control Plane"); and a distributed storage software ("Data Plane") to distribute storage requests among the storage nodes communicating through the storage endpoints, and the dynamic routing protocols and are managed as a collective by a distributed control system and preferably configured to distribute storage requests among storage nodes.

3. The device as claimed in claim 1, wherein the dynamic routing protocol produces a new storage endpoint upon being informed of the IP addresses of the storage endpoints, wherein the dynamic routing protocol is selected from at least one of a Border Gateway Protocol (BGP); and an Open Shortest Path First (OSPF).

4. The device as claimed in claim 1, wherein the network is an L3 network or L3 data center network or an L3 network adapted to span data centers.

5. The device as claimed in claim 1, wherein the summarized or re-advertised information is adapted to cause route tables on all the nodes and/or networking equipments to change or update or reflect a new or altered path to the storage endpoints based on the information.

6. A system comprising:
one or more nodes and one or more storage endpoints having respective IP addresses forming a network;
at least one device, selected from the one or more nodes, comprising:
a receiving module configured to receive at least an information associated with the storage endpoints advertised by the one or more nodes of the network, wherein the information is IP addresses associated with the storage endpoints or removal and/or updation of the IP address of the storage endpoints, wherein the IP address associated with the storage endpoints is advertised via a dynamic routing protocol to the network; and an update module configured to summarize or re-advertise the information received from the one or more nodes, and advertise the summarized or re-advertised information to all nodes of the network to be utilized by the one or more nodes to achieve communication between the node and the storage endpoint based on the summarized or re-advertised information, wherein the one or more nodes initiates a request through the storage endpoints, wherein the request is selected from at least one of: read stored data, modify stored data, and obtain information about a distributed scale-out storage system.

7. A method comprising the steps of:
advertising, by one or more nodes of an network, an information associated with at storage endpoints available on the network, wherein the information is an IP address associated with the storage endpoint or removal and/or updation of the IP address of the storage endpoint, wherein the IP address associated with the storage endpoints is advertised via a dynamic routing protocol to the network;
receiving, by a device selected from the one or more nodes of the network, the information associated with the storage endpoints advertised by one or more nodes;
summarizing, by the device, the information received from the one or more nodes based on the information received;
re-advertising, by the device, the summarized information to nodes of the network;
utilizing, by nodes of the network, the summarized information to achieve communication between the node and the storage endpoint, wherein the one or more nodes initiates a request through the storage endpoints, wherein the request is selected from at least one of: read stored data, modify stored data, and obtain information about a distributed scale-out storage system.

8. The method as claimed in claim 7 further comprising the steps of: utilizing a dynamic routing protocol to advertise the information associated with the storage endpoints to the device.

9. The method as claimed in claim 7, wherein the network is an L3 network or L3 data center network or an L3 network adapted to span data centers.

10. The method as claimed in claim 7, wherein the summarized or re-advertised information is adapted to cause route tables on all the nodes and/or networking equipments to change or update or reflect a new or altered path to the storage endpoints based on the information.

* * * * *